US008739036B2

(12) United States Patent  
Morimoto

(10) Patent No.: US 8,739,036 B2  
(45) Date of Patent: May 27, 2014

(54) ELECTRONIC DEVICE, COMPUTER READABLE MEDIUM, AND HELP DISPLAY METHOD

(75) Inventor: Toshimitsu Morimoto, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 864 days.

(21) Appl. No.: 12/496,058

(22) Filed: Jul. 1, 2009

(65) Prior Publication Data  
US 2010/0088599 A1 Apr. 8, 2010

(30) Foreign Application Priority Data  
Jul. 25, 2008 (JP) ................................ 2008-192577

(51) Int. Cl.  
*G06F 3/00* (2006.01)

(52) U.S. Cl.  
USPC ........................................................... 715/705

(58) Field of Classification Search  
USPC ................................................. 715/705–715  
See application file for complete search history.

(56) References Cited

U.S. PATENT DOCUMENTS

| | | | | |
|---|---|---|---|---|
| 5,235,679 A | * | 8/1993 | Yoshizawa et al. | 715/709 |
| 5,754,176 A | * | 5/1998 | Crawford | 715/711 |
| 6,307,544 B1 | * | 10/2001 | Harding | 715/709 |
| 6,636,236 B1 | * | 10/2003 | Toda | 715/707 |
| 2003/0058267 A1 | * | 3/2003 | Warren | 345/705 |
| 2005/0114775 A1 | * | 5/2005 | Inui et al. | 715/707 |
| 2006/0139337 A1 | * | 6/2006 | Fukao | 345/173 |
| 2007/0061723 A1 | * | 3/2007 | Ohga et al. | 715/705 |
| 2008/0215976 A1 | * | 9/2008 | Bierner et al. | 715/708 |

FOREIGN PATENT DOCUMENTS

| | | |
|---|---|---|
| EP | 1 043 650 A2 | 11/2000 |
| JP | 2000-231429 | 8/2000 |
| JP | 1270350 | 10/2000 |
| JP | 1787667 | 6/2006 |
| JP | 2007-102426 | 4/2007 |

* cited by examiner

Primary Examiner — Enrique Iturralde  
(74) Attorney, Agent, or Firm — Dykema Gossett PLLC

(57) ABSTRACT

An electronic device comprising: a display unit configured to display a setting menu; an operation unit configured to receive an operation from a user; an operation detection unit configured to detects the operation received by the operation unit; a timer unit configured to measure an elapsed time that has elapsed since a start operation relating to a setting of a given function received by the operation unit is detected by the operation detection unit; and a help display processing unit configured to cause the display unit to display help information thereon when an end operation relating to the given function to the operation unit has not been detected by the operation detection unit before the elapsed time measured by the timer unit reaches a predetermined time.

11 Claims, 7 Drawing Sheets

ELECTRONIC DEVICE, COMPUTER READABLE MEDIUM, AND HELP DISPLAY METHOD

This application is based upon and claims the benefit of priority from the corresponding Japanese Patent Application No. 2008-192577, filed Jul. 25, 2008, the entire contents of which is incorporated herein by reference.

BACKGROUND

1. Field of the Invention

The present invention relates to an electronic device, a medium having a help display program recorded therein, and a help display method.

2. Description of the Related Art

Electronic devices operating according to a user's operation include one that displays help information in order to assist the user's operation. In addition, there is a device that selectively provides the help information based on a history of the user's operations when the user makes a request for a help.

SUMMARY

In one embodiment, the present invention provides an electronic device comprises a display unit, an operation unit, an operation detection unit, a timer unit, and a help display processing unit. Here, the display unit is configured to display a setting menu. The operation unit is configured to receive an operation from a user. The operation detection unit is configured to detect the operation received by the operation unit. The timer unit is configured to measure an elapsed time that has elapsed since a start operation relating to a setting of a given function received by the operation unit is detected by the operation detection unit The help display processing unit is configured to cause the display unit to display help information thereon when an end operation relating to the given function has not been detected by the operation detection unit before the elapsed time measured by the timer unit reaches a predetermined time.

In another embodiment, the present invention provides a computer readable medium that records a help display program. The help display program is configured to cause a computer built into an electronic device to function as the display unit, an operation unit, an operation detection unit, a timer unit, and a help display processing unit. Here, the display unit is configured to display a setting menu. The operation unit is configured to receive an operation from a user. The operation detection unit is configured to detect the operation received by the operation unit. The timer unit is configured to measure an elapsed time that has elapsed since a start operation relating to a setting of a given function received by the operation unit is detected by the operation detection unit The help display processing unit is configured to cause the display unit to display help information thereon when an end operation relating to the given function has not been detected by the operation detection unit before the elapsed time measured by the timer unit reaches a predetermined time.

In still another, the present invention provides a help display method comprises: (1) detecting an operation input by a user into an operation unit; (2) measuring an elapsed time that has elapsed since detection of a start operation relating to a setting of a given function received by the operation unit; and (3) causing a display unit to display help information thereon when an end operation relating to the given function to the operation unit has not been detected before the elapsed time reaches a predetermined time.

Additional features and advantages are described herein, and will be apparent from the following Detailed Description and the Figures.

DETAILED DESCRIPTION

An electronic device 100 normally provides help information in response to a request made by a user.

However, some users think that it is quicker to seek a desired operation while trying various operations than to perform an operation by reading the help information. In such a case, a desired operation method is often hard to find, which conversely requires a longer time for performing the operations.

According to the present invention, such a configuration as follows allows necessary help information to be provided when the user needs the help information.

Hereinafter, an embodiment of the present invention is described by referring to the accompanying drawings.

Figure 1:
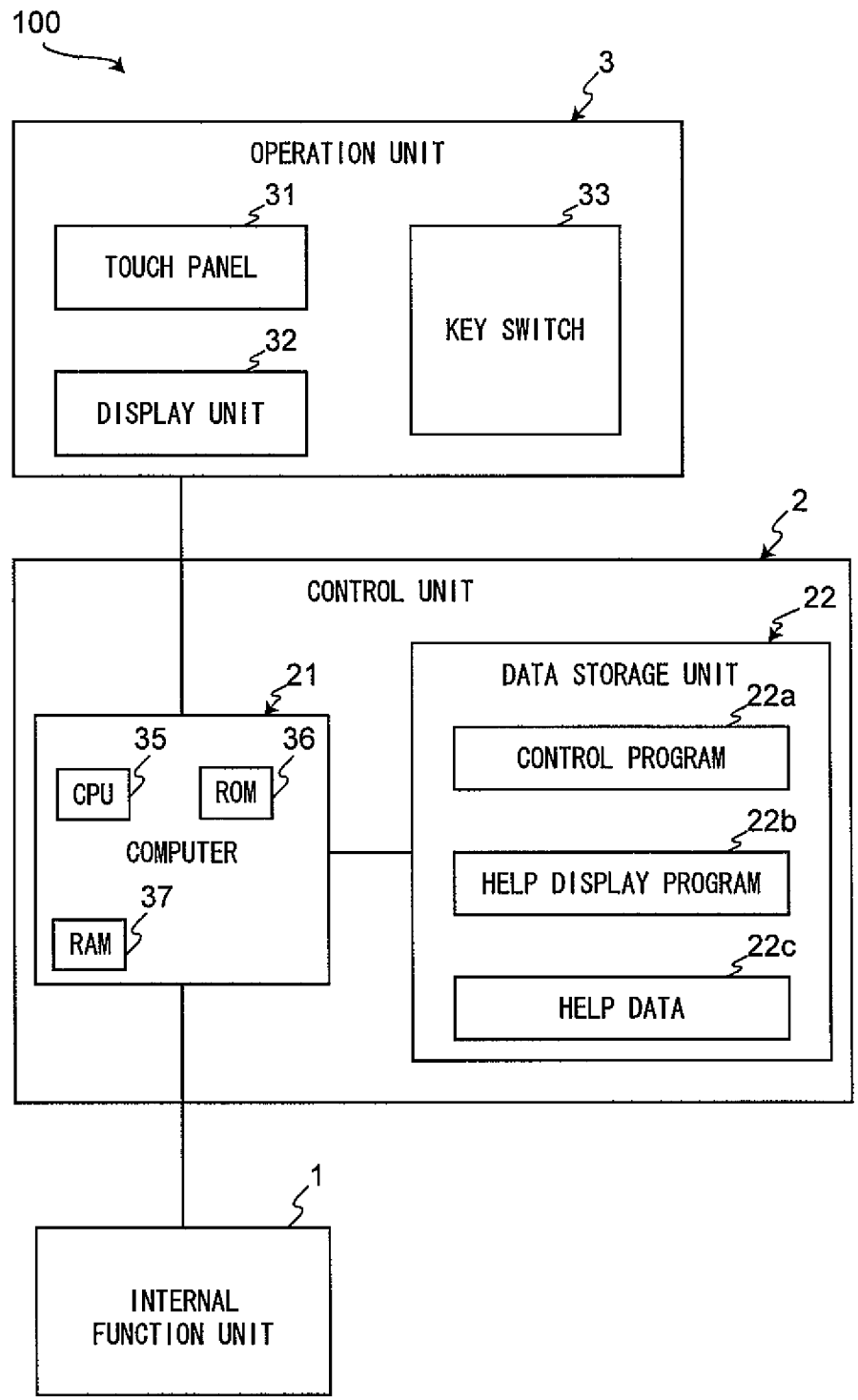
FIG. 1 shows a block diagram illustrating a configuration of an electronic device according to an embodiment of the present invention.

FIG. 1 is a block diagram illustrating a configuration of an electronic device 100 according to the embodiment of the present invention. In FIG. 1, an internal function unit 1 is an electronic circuit and a mechanism for implementing a function of the electronic device 100. For example, in a case where the electronic device 100 is an image forming apparatus, the internal function unit 1 includes an image processing unit for implementing a printing function, a mechanical mechanism for printing an image on printing paper, and a scanner for implementing an image reading function.

In addition, a control unit 2 controls the internal function unit 1 and a display unit 32 according to a user's operation to an operation unit 3 and a state of the internal function unit 1. The control unit 2 includes a computer 21 and a data storage unit 22.

The computer 21 includes a central processing unit (CPU) 35, a read only memory (ROM) 36, and a random access memory (RAM) 37, in which various programs are loaded from the data storage unit 22 into the RAM 37, and the CPU 35 executes the various programs. This realizes various processing units.

The data storage unit 22 stores a control program 22a and a help display program 22b that are executed by the computer 21 and help data 22c containing help information. Used as the data storage unit 22 is a hard disk drive, a rewritable nonvolatile memory such as an electrically erasable and programmable ROM (EEPROM), or the like. The help information contains text data and image data that indicate descriptions of each function and each setting item and an operation procedure.

Figure 2:
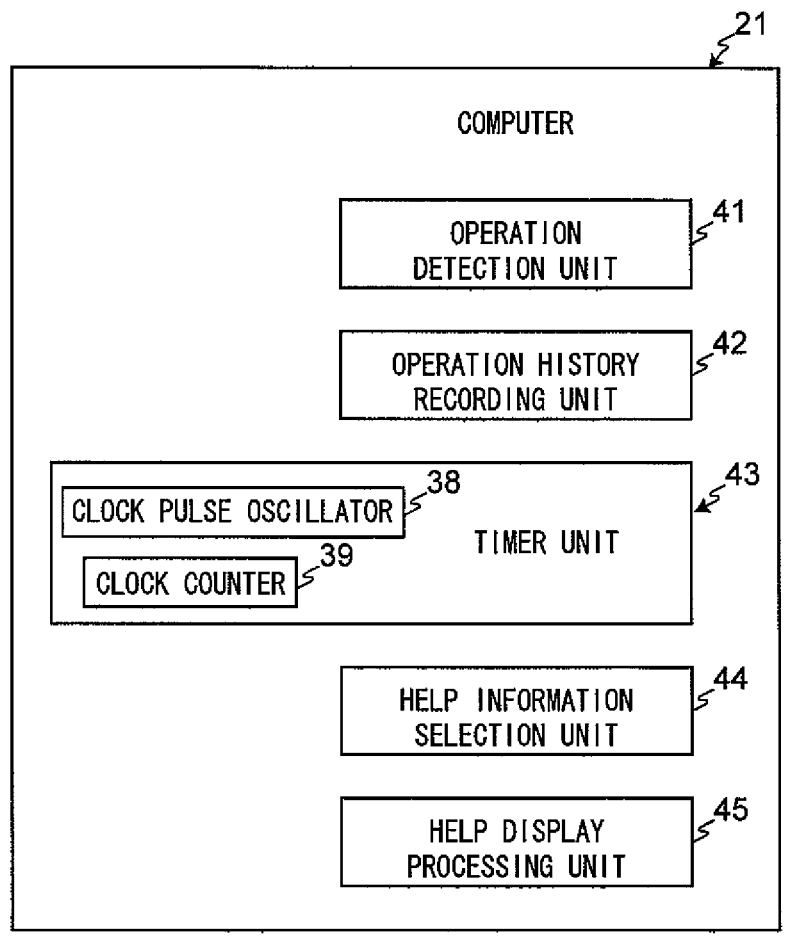
FIG. 2 illustrates a configuration of processing units realized by a computer illustrated in FIG. 1 executing a help display program.

FIG. 2 is a diagram illustrating processing units realized by the computer 21 illustrated in FIG. 1 executing the help display program 22b.

In FIG. 2, an operation detection unit 41 receives a signal from the operation unit 3 and detects an operation input by the user into the operation unit 3.

An operation history recording unit 42 records an operation history of operations to the operation unit 3 after detection of a start operation relating to a setting of a given function to the operation unit 3. The operation history recording unit 42 records the operation history in the RAM 37 included in the computer 21 or the data storage unit 22.

A timer unit 43 measures an elapsed time that has elapsed since the detection of the start operation relating to the setting of a given function to the operation unit 3. Specifically, the timer unit 43 includes a clock pulse oscillator 38 and a clock counter 39. The timer unit 43 measures the elapsed time by causing the clock counter 39 to count clock pulses oscillated by the clock pulse oscillator 38 at regular intervals.

A help information selection unit 44 selects help information based on the operation history recorded by the operation history recording unit 42.

A help display processing unit 45 causes the display unit 32 to display help information thereon in a case where an end operation relating to the function to the operation unit 3 has not been detected before the elapsed time measured by the timer unit 43 reaches a predetermined time. The help display processing unit 45 causes the display unit 32 to display the help information selected by the help information selection unit 44. The predetermined time is set to, for example, three minutes. Alternatively, the predetermined time may be set to different times on a setting item basis.

Figure 3:
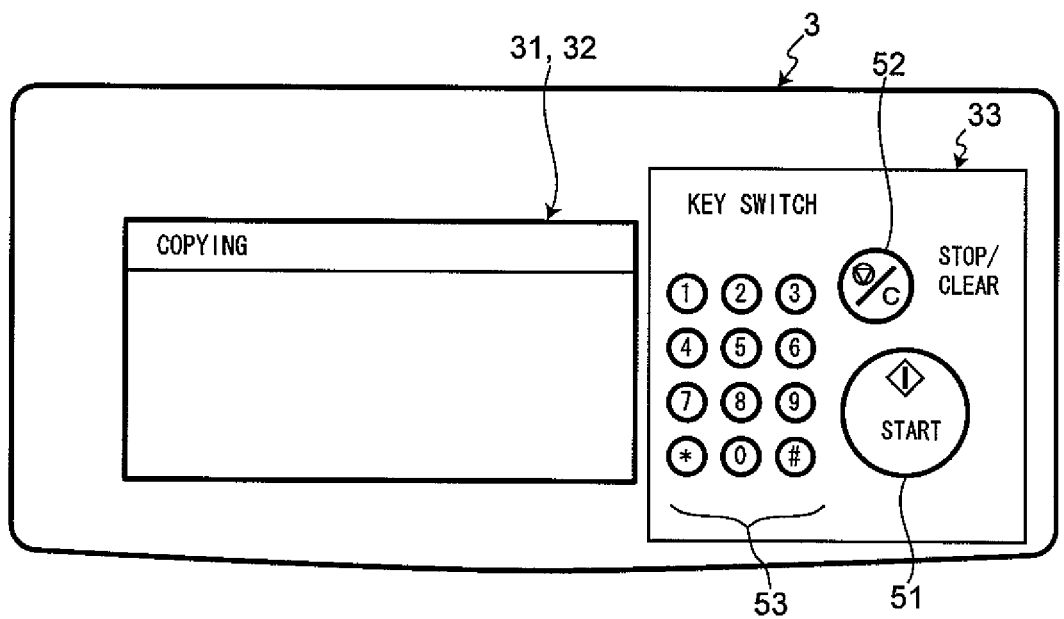
FIG. 3 illustrates an operation panel exemplifying an operation unit illustrated in FIG. 1.

Further, the operation unit 3 illustrated in FIG. 1 is operated by the user, and outputs an electronic signal corresponding to an operation from the user. FIG. 3 is a diagram illustrating an operation panel exemplifying the operation unit 3 illustrated in FIG. 1. For example, such an operation panel as illustrated in FIG. 3 is installed to a casing of the image forming apparatus as the operation unit 3.

The operation unit 3 includes a touch panel 31, the display unit 32, and a key switch 33. The touch panel 31 is an input device having a transparent plate-like shape, which is installed on a screen of the display unit 32 and detects the user's depression operation and its operation position. The display unit 32 is a device that displays a setting menu and the help information along with images of tabs and buttons and the like. The images displayed by the display unit 32 and the touch panel 31 realize tabs and buttons that can be operated by the user. The key switch 33 includes specific-purpose keys such as a start key 51 and a stop key 52 and general-purpose keys such as numeric keys 53. Note that instead of the display unit 32, a display unit that displays the help information may be installed independently of the operation unit 3.

Next, description is made of an operation of the above-mentioned electronic device 100.

First, the internal function unit 1 is controlled by the control unit 2 according to the control program 22a.

Figure 4:
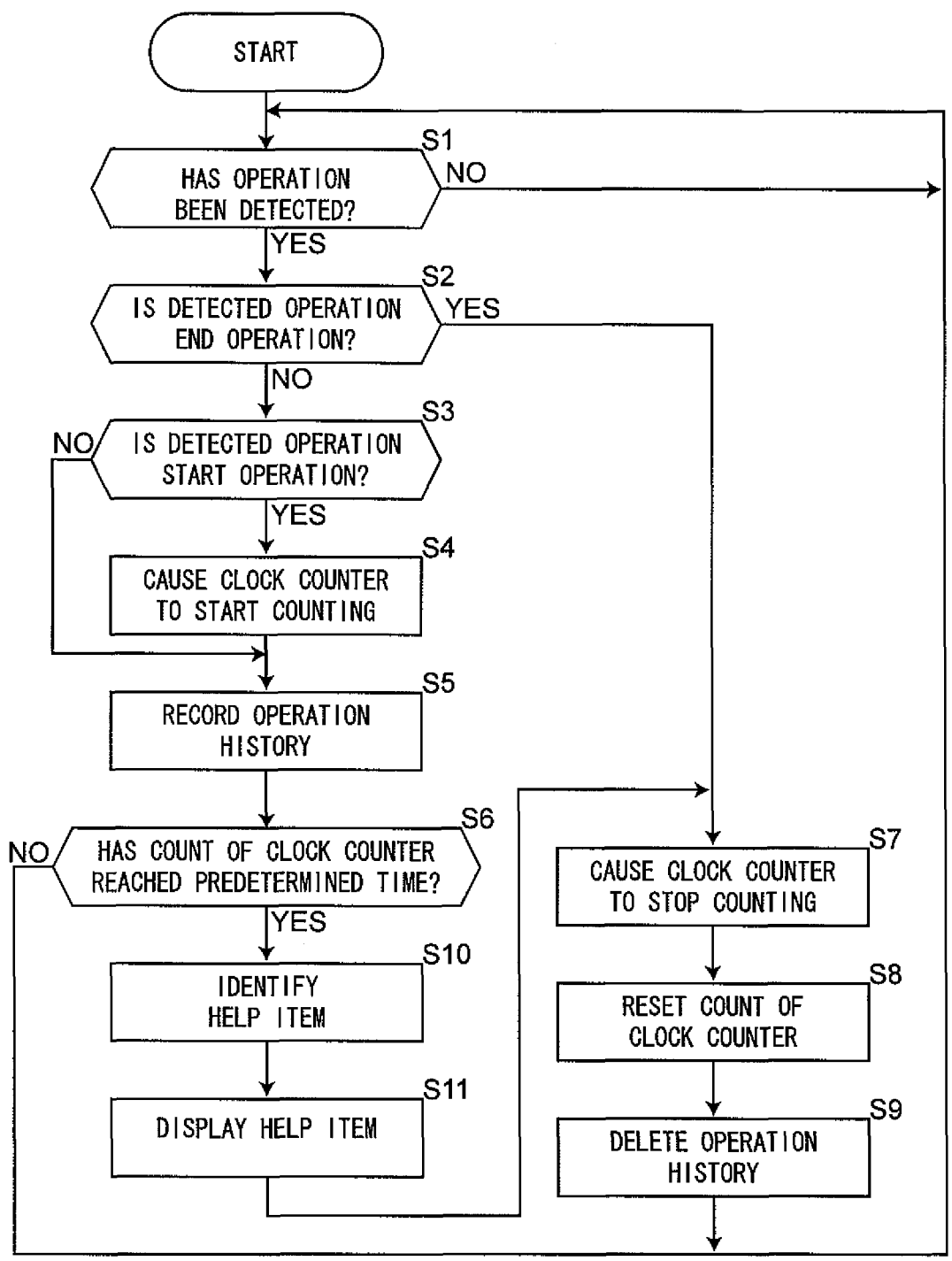
FIG. 4 illustrates a flowchart for describing an operation related to help display on the electronic device illustrated in FIG. 1.

Subsequently, when the user's operation to the operation unit 3 is detected, an operation related to help display is performed. FIG. 4 is a flowchart for describing an operation related to the help display on the electronic device 100 illustrated in FIG. 1.

When the operation detection unit 41 detects the user's operation to the operation unit 3 (Step S1), the operation detection unit 41 determines whether or not the operation is the end operation corresponding to the start operation detected relating to a given function in the past (Step S2). At this time, the operation detection unit 41 detects which region the operation has been performed in, and identifies what kind of operation has been performed. For example, the operation detection unit 41 identifies an operated button from an operation-detected position on the touch panel 31.

For example, in a case of the copy function, an operation for starting up the device or switching to a copy mode is recognized as the start operation, and depression of the start button 51 is recognized as the end operation. Further, in a case of a reduction/enlargement setting function of the copy function, an operation for switching to a reduction/enlargement setting screen is recognized as the start operation, and an operation for determining a magnification setting or closing the reduction/enlargement setting screen is recognized as the end operation.

When the detected operation is not the end operation ("NO" in Step S2), the operation detection unit 41 determines whether or not the detected operation is the start operation (Step S3). When the detected operation is the start operation ("YES" in Step S3), the timer unit 43 resets a count value of the clock counter 39 (it is defined that the count value is set to an initial value, for example, zero, which is also true of the following description), and starts counting (Step S4).

In addition, when the detected operation is not the end operation, the operation history recording unit 42 records information on the detected operation in the operation history (Step S5). Every time an operation is detected, the information is recorded in the operation history in a chronological order.

Then, the timer unit 43 determines whether or not the count value of the clock counter 39 has reached a predetermined time (Step S6).

When the timer unit 43 determines that the count value of the clock counter 39 has not reached the predetermined time ("NO" in Step S6), a processing corresponding to the currently-detected operation is brought to an end.

Meanwhile, when the detected operation is the end operation ("YES" in Step S2), the timer unit 43 causes the clock counter 39 to stop counting (Step S7), and resets the count value (Step S8). In addition, when the detected operation is the end operation, the operation history recording unit 42 deletes a part of the operation history from the start operation to the end operation (Step S9).

In such a manner, when the end operation is detected before the predetermined time has elapsed since the start operation, the help information is not displayed.

Meanwhile, when an operation other than the start operation and the end operation is detected ("NO" in both Steps S2 and S3), and when the predetermined time has elapsed since the start operation, the count value of the clock counter 39 has reached the predetermined time ("YES" in Step S6), and hence in Step S6, the timer unit 43 determines that the count value of the clock counter 39 has reached the predetermined time.

When it is the timer unit 43 determines that the count value of the clock counter 39 has reached the predetermined time, based on the operation history recorded by the operation history recording unit 42, the help information selection unit 44 selects help information on an item ("help item" in FIG. 4) to be subjected to the help display from the help information contained in the help data 22*c* (Step S10). When the help information is selected, the help display processing unit 45 causes the display unit 32 to display the selected help information thereon (Step S11).

Subsequently, after the displaying of the help information is completed according to a predetermined operation, the counting performed by the clock counter 39 is stopped or reset, and the operation history is deleted (Steps S7 to S9).

In such a manner, in a case where an operation other than the start operation and the end operation is repeatedly performed until a predetermined time has elapsed, the help information is displayed.

Here, description is made of the selection of the item to be subjected to the help display.

The help information selection unit 44 selects the item to be subjected to the help display based on the operation history recorded by the operation history recording unit 42. In that case, the help information selection unit 44 selects a given item included in a structure of the setting menu, for example, one or more items in the vicinity of the last operation in the operation history, or selects an upper-layer setting item within a hierarchical structure than a setting item upon the last operation in the operation history.

Figure 5:
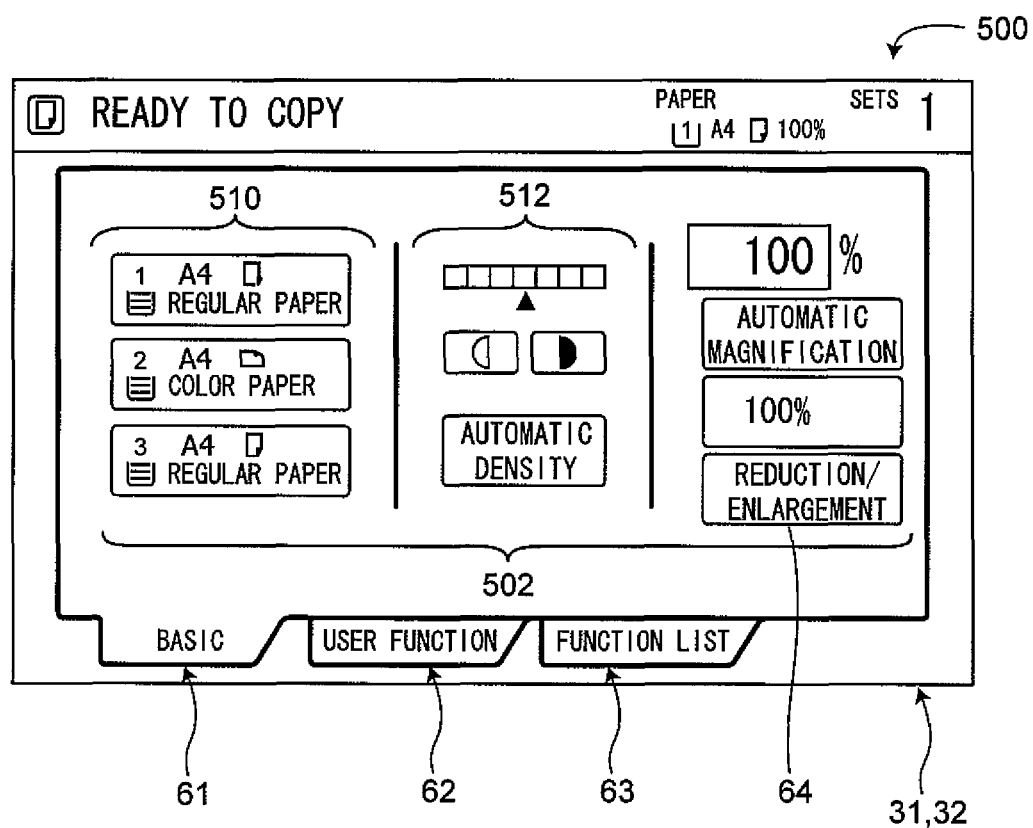
FIG. 5 illustrates a display example of a setting menu on the electronic device illustrated in FIG. 1.

Further, when the help information selection unit 44 determines based on the operation history that one or more specific tabs have been displayed a predetermined number of times by switching operations between the tabs in the setting menu, the help information selection unit 44 may select the help information on setting items corresponding to the one or more specific tabs. FIG. 5 illustrates a display example of the setting menu 500 on the electronic device 100 illustrated in FIG. 1. In the setting menu 500 illustrated in FIG. 5, three tabs 61, 62, and 63 are displayed. When one of the tabs 61, 62, and 63 is depressed, the depression operation is detected by the touch panel 31, and the depressed tab is displayed on the front by the computer 21 according to the control program 22*a*. Therefore, for example, in a case where the tab displayed on the front is switched from the tab 61 to the tab 63 and then from the tab 63 back to the tab 61, and the two specific tabs 61 and 63 are switched by such switching to be displayed the predetermined number of times, the help information selection unit 44 selects the help information on setting items 502, 504 corresponding to the tabs 61 and 63 ("basic" and "function list"), respectively, or on setting items corresponding to an entirety of a tab array including the former setting items 502, 504.

Figure 6:
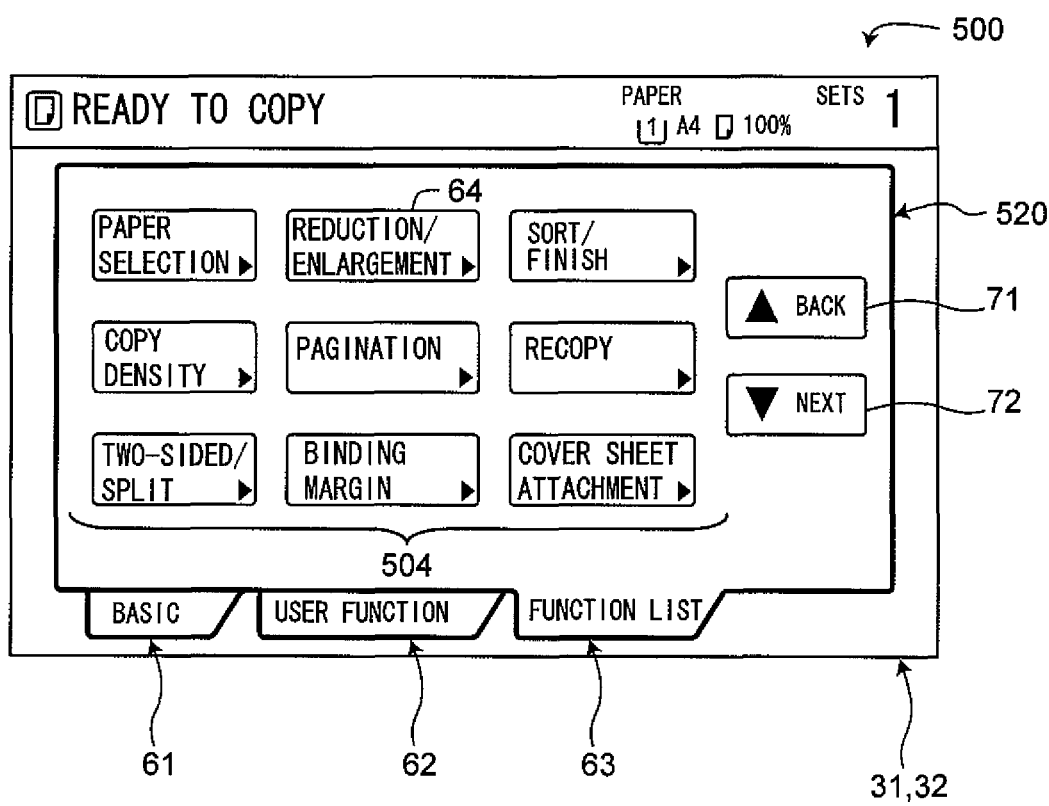
FIG. 6 illustrates an example of a screen that can be scrolled in the setting menu on the electronic device illustrated in FIG. 1.

Alternatively, when the help information selection unit 44 determines based on the operation history that an operation of scrolling up and down a setting screen in the setting menu 500 has been performed a predetermined number of times (for example, three times), the help information selection unit 44 may select the help information relating to a setting item on the setting screen. FIG. 6 is a diagram illustrating an example of a screen 520 that can be scrolled in the setting menu 500 on the electronic device 100 illustrated in FIG. 1. In FIG. 6, the tab 63 is displayed on the front. On the setting screen 520 of the tab 63, the function list is displayed while being ready to be scrolled. That is, there also exists a function button other than the function buttons 504 illustrated in FIG. 6, and when a scroll button 71 or 72 is operated, a list screen is scrolled according to its operation amount, and another function button is displayed. For example, in a case where the scroll buttons 71 and 72 are alternately operated, and the operation of scrolling up and down is detected a predetermined number of times or more, the help information selection unit 44 selects the help information relating to the setting item ("function list").

Figure 7:
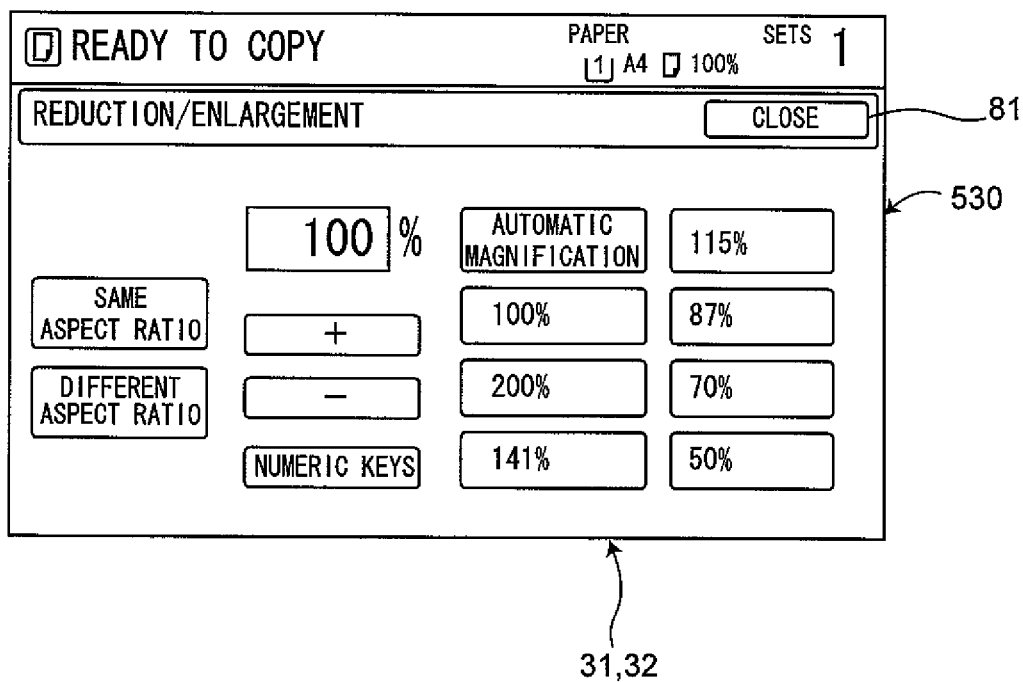
FIG. 7 shows a diagram illustrating an example of a lower-layer setting screen of the setting menu on the electronic device illustrated in FIG. 1.

Further, in a case where the setting menu 500 has a hierarchical structure, when the help information selection unit 44 determines based on the operation history that an operation of moving back and forth between an upper-layer setting screen and a lower-layer setting screen in the hierarchical structure has been performed a predetermined number of times (for example, three times), the help information selection unit 44 may select the help information relating to a setting item on the upper-layer setting screen. FIG. 7 is a diagram illustrating an example of the lower-layer setting screen 530 of the setting menu 500 on the electronic device 100 illustrated in FIG. 1. For example, when a "reduction/enlargement" button 64 of FIG. 5 is depressed, the lower-layer setting screen 530 for "reduction/enlargement" is displayed as illustrated in FIG. 7. After that, a "close" button 81 of FIG. 7 is depressed, the screen returns to the one illustrated in FIG. 5 (520). In such a manner, when the "reduction/enlargement" button 64 and the "close" button 81 are alternately depressed, the help information selection unit 44 determines that the operation of moving back and forth between the upper-layer setting screen 520 and the lower-layer setting screen 530 in the hierarchical structure has been performed.

Further, in the case where the setting menu 500 has a hierarchical structure, when the help information selection unit 44 determines based on the operation history that the operation of moving back and forth between the upper-layer setting screen 520 and the lower-layer setting screen 530 in the hierarchical structure has been performed the predetermined number of times (for example, three times), the help information selection unit 44 may select the help information relating to a setting item on an undisplayed setting screen of the lower-layer setting screen 530. For example, when the "reduction/enlargement" button 64 and the "close" button 81 are alternately depressed the predetermined number of times, the help information selection unit 44 selects the help information on the other setting items ("paper setting" 510 and "density setting" 512) corresponding to the "basic" tab 61.

As described above, in the above-mentioned embodiment, the elapsed time that has elapsed since detection of the start operation relating to the setting of a given function to the operation unit 3 is measured. Then, when the operation other than the start operation and the end operation is detected, when the elapsed time has reached the predetermined time, the help information is displayed on the display unit 32.

This makes it possible to automatically provide the help information in a case where the user continues to perform operations without knowing a setting operation procedure before performing the end operation. Accordingly, it is possible to provide necessary help information to be provided when the user needs the help information.

Note that the above-mentioned embodiment is a preferred embodiment of the present invention, but the present invention is not limited thereto, and various modifications and changes can be made within the scope that does not depart from the gist of the present invention.

For example, in the above-mentioned embodiment, when there is a plurality of items to be subjected to the help display, a list of the items may be first displayed, and the help information on the items selected by the user may be displayed.

Further, in the above-mentioned embodiment, the operation unit 3 may be a remote controller. In that case, a device main body is provided with a communication unit that performs communications with the remote controller. The communications with the remote controller are performed by an infrared communication, a short-range wireless communication or the like.

Further, in the above-mentioned embodiment, in a case where the subsequent operation is not detected within a predetermined time (which is the same as the predetermined time used in Step S6 or is separately set; for example, 30 seconds), the timer unit 43 may cause the clock counter 39 to stop counting to reset the count value, and the operation history recording unit 42 may delete the operation history. Alternatively, in a case where the subsequent operation is not detected within a predetermined time (which is separately set to a shorter time than the predetermined time used in Step S6; for example, 30 seconds), the timer unit 43 may cause the clock counter 39 to stop counting, and may cause the clock counter 39 to restart counting when the subsequent operation is detected. In such cases, the processing flow may be configured to advance to Step S6 when Step S1 results in "No". In the thus-configured cases, even when an unoperated time elapses for a long time, it is possible to display the help information.

Further, in the above-mentioned embodiment, one or both of the processings of Steps S7 and S8 may be omitted.

Further, in the above-mentioned embodiment, the operation detection unit 41 may detect the end operation for a lower-layer setting item as the start operation for an upper-layer setting item. For example, in the copy function, the clock counter 39 may be caused to start counting in accordance with detection of an operation for selecting the copy function (start operation for the upper-layer setting item) (Step S4), then the count value of the clock counter 39 may be reset in accordance with detection of depression of the "reduction/enlargement" button 64 (start operation for the lower-layer setting item) (Step S4), and after the operation history is deleted in accordance with detection of depression of the "close" button 81 (end operation for the lower-layer setting item) (Step S9), the procedure may return to Step S4, in which the clock counter 39 restarts the counting with regard to the operation for selecting the copy function.

Further, in the above-mentioned embodiment, the number of clock counters included in the timer unit 43 is not limited to 1, and a plurality of clock counters may be caused to run with regard to the upper-layer setting item and the lower-layer setting item independently of each other. For example, in the copy function, one clock counter may be used with regard to a series of operations from the operation for selecting the copy function (start operation) to the depression of the start button 51 (end operation), and another clock counter may be used with regard to a series of operations from the depression of the "reduction/enlargement" button 64 (start operation) to the depression of the "close" button 81 (end operation). In this case, when the operation detection unit 41 detects the start operation for the lower-layer setting item, the timer unit 43 may cause the clock counter to stop counting with regard to the upper-layer setting item. Then, in accordance with the end operation for the lower-layer setting item, the timer unit 43 may cause the clock counter to restart counting with regard to the upper-layer setting item.

Further, as another example, in the copy function, the timer unit 43 may cause one clock counter to start counting in accordance with detection of the operation for selecting the copy function (start operation), cause another clock counter to start counting in accordance with detection of the depression of the "reduction/enlargement" button 64 (start operation), and cause both the clock counters to stop counting in accordance with detection of the depression of the "close" button 81 (end operation).

Further, in the above-mentioned embodiment, after the detection of the start operation, it may be constantly monitored whether or not the count value of the clock counter has reached a predetermined time.

Further, in the above-mentioned embodiment, the help display program 22b may be provided by being stored in a portable recording medium, such as a CD-ROM, and stored from the recording medium into the data storage unit 22. Alternatively, the help display program 22b may be downloaded from a program server through a network to be stored into the data storage unit 22.

Further, in the above-mentioned embodiment, the help display program 22b may be stored in the ROM 36 of the computer 21, and as necessary, loaded into the RAM 37 of the computer 21 to be executed.

The present invention can be applied to, for example, the help display on the electronic device such as the image forming apparatus, which is a printer or a multifunction peripheral, a cell phone and another information terminal, a television system, an automated teller machine or the like.

In part, in an embodiment, the invention may be summarized as follows.

In one embodiment, the present invention provides an electronic device comprises a display unit, an operation unit, an operation detection unit, a timer unit, and a help display processing unit. Here, the display unit is configured to display a setting menu. The operation unit is configured to receive an operation from a user. The operation detection unit is configured to detect the operation received by the operation unit. The timer unit is configured to measure an elapsed time that has elapsed since a first start operation relating to a setting of a given function received by the operation unit is detected by the operation detection unit The help display processing unit is configured to cause the display unit to display help information thereon when an end operation relating to the given function has not been detected by the operation detection unit before the elapsed time measured by the timer unit reaches a predetermined time.

This makes it possible to automatically provide the help information in the case where the user continues to perform operations without knowing the setting operation procedure before performing the end operation. Accordingly, it is possible to provide necessary help information to be provided when the user needs the help information.

In addition to the above-mentioned configuration, when the operation detection unit detects a second start operation received by the operation unit before the elapsed time reaches the predetermined time, the timer unit may resets the elapsed time that has been measured up until detection of the second start operation, and start to measure an elapsed time that has elapsed since the second start operation was detected by the operation detection unit.

This prevents the help information from being quickly displayed with regard to the user's operation starting from the new start operation.

In addition to the above-mentioned configuration, the electronic device may comprise an operation history recording unit and a help information selection unit. Here, the operation history recording unit is configured to record an operation history of operations received by the operation unit after the first start operation was detected by the operation detection unit. The help information selection unit configured to select help information based on the operation history recorded by the operation history recording unit. Then, the help display processing unit is configured to cause the display unit to display the help information selected by the help information selection unit.

The help information is thus selected and provided based on the operation history, which makes it possible to provide necessary help information to be provided when the user needs the help information.

Further, when the help information selection unit determines that one or a plurality of specific tabs has been displayed a predetermined number of times by switching operations between the tabs in the setting menu, the help information selection unit may select the help information relating to the setting items corresponding to the one or more specific tabs.

Accordingly, a part of the setting operation procedure which is more unlikely to be understood by the user is identified based on the operation history, and the help information needed by the user is appropriately selected.

Further, when the help information selection unit determines that the operation of scrolling up and down the setting screen in the setting menu has been performed a predetermined number of times, the help information selection unit may select the help information relating to the setting item on the setting screen.

Accordingly, the part of the setting operation procedure which is more unlikely to be understood by the user is identified based on the operation history, and the help information needed by the user is appropriately selected.

Further, the setting menu may have a hierarchical structure. In this case, when the help information selection unit determines that the operation of moving back and forth between the upper-layer setting screen and the lower-layer setting screen in the hierarchical structure has been performed a predetermined number of times, the help information selection unit may select the help information relating to a setting item on the upper-layer setting screen.

Accordingly, the part of the setting operation procedure which is more unlikely to be understood by the user is identified based on the operation history, and the help information needed by the user is appropriately selected.

Further, in the case where the setting menu has a hierarchical structure, when the help information selection unit determines that the operation of moving back and forth between the upper-layer setting screen and the lower-layer setting screen in the hierarchical structure has been performed the predetermined number of times, the help information selection unit may select the help information relating to the setting item on the undisplayed setting screen of the lower-layer setting screen.

Accordingly, the part of the setting operation procedure which is more unlikely to be understood by the user is identified based on the operation history, and the help information needed by the user is appropriately selected.

Further, when the help information selection unit selects a plurality of setting items, the help display processing unit may cause the display unit to display a list of the selected plurality of setting items thereon, and may cause the display unit to display the help information relating to a setting item selected from the list according to the operation received by the operation unit.

Accordingly, the part of the setting operation procedure which is more unlikely to be understood by the user is identified based on the operation history, and the help information needed by the user is appropriately selected.

Further, in the case where the setting menu has a hierarchical structure, the operation detection unit may be configured to detect the end operation for the lower-layer setting item as the start operation for the upper-layer setting item.

This eliminates the need for the detection of another start operation after the displayed setting screen is returned from a lower layer of the setting menu to an upper layer thereof.

Further, the timer unit may be configured to independently measure respective elapsed times with respect to a plurality of the start operations, and stop measuring the elapsed times with regard to the plurality of start operations in accordance with detection of the end operation.

This makes it possible to collectively stop measuring the plurality of elapsed times.

Further, the timer unit may be configured to independently measure respective elapsed times with respect to a plurality of start operations, stop measuring when the operation detection unit detects a second start operation, and restart measuring when the operation detection unit detects the end operation corresponding to the second start operation.

This makes it possible to suspend the help display with regard to another function during the operation of a given function.

In another embodiment, the present invention provides a computer readable medium that records the help display program. The help display program is configured to cause a computer built into the electronic device to function as a display unit, an operation unit, an operation detection unit, a timer unit, and a help display processing unit. Here, the display unit is configured to display a setting menu. The operation unit is configured to receive an operation from a user. The operation detection unit is configured to detect the operation received by the operation unit. The timer unit is configured to measure an elapsed time that has elapsed since a start operation relating to a setting of a given function received by the operation unit is detected by the operation detection unit The help display processing unit is configured to cause the display unit to display help information thereon when an end operation relating to the given function has not been detected by the operation detection unit before the elapsed time measured by the timer unit reaches a predetermined time.

This makes it possible to automatically provide the help information in the case where the user continues to perform operations without knowing the setting operation procedure before performing the end operation. Accordingly, it is possible to provide necessary help information to be provided when the user needs the help information.

In still another, the present invention provides a help display method comprises: (1) detecting an operation input by a user to into an operation unit; (2) measuring the elapsed time that has elapsed since detection of the start operation relating to a setting of a given function received by the operation unit; and (3) causing the display unit to display help information thereon when the end operation relating to the given function to the operation unit has not been detected before the elapsed time reaches the predetermined time.

This makes it possible to automatically provide the help information in the case where the user continues to perform operations without knowing the setting operation procedure before performing the end operation. Accordingly, it is possible to provide necessary help information to be provided when the user needs the help information.

According to the present invention, it is possible to obtain an electronic device, a help display program, and a help display method which provide necessary help information to be provided when the user needs the help information.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An electronic device, comprising:
a display unit configured to display a setting menu;
an operation unit configured to receive an operation from a user;
an operation detection unit configured to detect the operation received by the operation unit;
a timer unit configured to measure an elapsed time that has elapsed since a first start operation relating to a setting of a given function received by the operation unit is detected by the operation detection unit;
a help display processing unit configured to cause the display unit to display help information thereon if an end operation relating to the given function has not been detected by the operation detection unit and an operation other than the end operation has been detected by the operation detection unit when the elapsed time measured by the timer unit reaches a predetermined time after the first start operation is detected, wherein:
the timer unit is configured to stop measuring the elapsed time in accordance with detection of the end operation;
the first start operation comprises an operation of a first button; and
the end operation comprises an operation of a second button;
an operation history recording unit configured to record an operation history of operations received by the operation unit after the first start operation was detected by the operation detection unit; and
a help information selection unit configured to select help information based on the operation history recorded by the operation history recording unit, wherein:
the help display processing unit is configured to cause the display unit to display the help information selected by the help information selection unit, and
when the help information selection unit determines that one or more specific tabs have been displayed a predetermined number of times by switching operations between the tabs in the setting menu, the help information selection unit selects help information relating to setting items corresponding to the one or more specific tabs.

2. The electronic device according to claim 1, wherein, when the operation detection unit detects a second start operation received by the operation unit before the elapsed time reaches the predetermined time, the timer unit resets the elapsed time that has been measured up until detection of the second start operation, and starts to measure an elapsed time that has elapsed since the second start operation was detected by the operation detection unit.

3. The electronic device according to claim 1, wherein, when the help information selection unit determines that an operation of scrolling up and down a setting screen in the setting menu has been performed a predetermined number of times, the help information selection unit selects help information relating to a setting item on the setting screen.

4. The electronic device according to claim 1, wherein:
the setting menu has a hierarchical structure; and
when the help information selection unit determines that an operation of moving back and forth between an upper-layer setting screen and a lower-layer setting screen in the hierarchical structure has been performed a predetermined number of times, the help information selection unit selects help information relating to a setting item on an upper-layer setting screen.

5. The electronic device according to claim 1, wherein:
the setting menu has a hierarchical structure; and
when the help information selection unit determines that an operation of moving back and forth between an upper-layer setting screen and a lower-layer setting screen in the hierarchical structure has been performed a predetermined number of times, the help information selection unit selects help information relating to a setting item on an undisplayed setting screen of the lower-layer setting screen.

6. The electronic device according to claim 1, wherein, when the help information selection unit selects a plurality of setting items, the help display processing unit causes the display unit to display a list of the selected plurality of setting items thereon, and causes the display unit to display the help information relating to a setting item selected from the list according to the operation received by the operation unit.

7. The electronic device according to claim 1, wherein:
the setting menu has a hierarchical structure; and
the operation detection unit is further configured to detect the end operation for a lower-layer setting item as the start operation for an upper-layer setting item.

8. The electronic device according to claim 1, wherein the timer unit is configured to independently measure respective elapsed times with respect to a plurality of the start operations, and stop measuring the elapsed times with regard to the plurality of the start operations in accordance with detection of the end operation.

9. The electronic device according to claim 1, wherein the timer unit is configured to independently measure respective elapsed times with respect to a plurality of the start operations, stop measuring when the operation detection unit detects a second start operation, and restart measuring when the operation detection unit detects the end operation corresponding to the second start operation.

10. A non-transitory computer readable medium recording a help display program configured to cause a computer built into an electronic device to function as:
a display unit configured to display a setting menu;
an operation unit configured to receive an operation from a user;
an operation detection unit configured to detect the operation received by the operation unit;
a timer unit configured to measure an elapsed time that has elapsed since a start operation relating to a setting of a given function received by the operation unit is detected by the operation detection unit; and
a help display processing unit configured to cause the display unit to display help information thereon if an end operation relating to the given function has not been detected and an operation other than the end operation has been detected by the operation detection unit when the time measured by the elapsed timer unit reaches a predetermined time after the first start operation is detected, the timer unit configured to stop measuring the elapsed time in accordance with detection of the end operation, wherein:
the first start operation comprises an operation of a first button; and
the end operation comprises an operation of a second button;
an operation history recording unit configured to record an operation history of operations received by the operation unit after the first start operation was detected by the operation detection unit; and a help information selection unit configured to select help information based on the operation history recorded by the operation history recording unit, wherein:

the help display processing unit is configured to cause the display unit to display the help information selected by the help information selection unit, and when the help information selection unit determines that one or more specific tabs have been displayed a predetermined number of times by switching operations between the tabs in the setting menu, the help information selection unit selects help information relating to setting items corresponding to the one or more specific tabs.

11. A help display method comprising:

detecting an operation input by a user into an operation unit;

measuring an elapsed time that has elapsed since detection of a start operation relating to a setting of a given function received by the operation unit;

causing a display unit to display help information thereon if an end operation relating to the given function has not been detected and an operation other than the end operation has been detected when the elapsed time reaches a predetermined time after the first operation is detected;

stopping measuring the elapsed time in accordance with detection of the end operation, wherein:

the first start operation comprises an operation of a first button; and the end operation comprises an operation of a second button;

recording an operation history of operations received after the first start operation is detected;

selecting help information based on the operation history recorded;

displaying the help information selected; and when it is determined that one or more specific tabs have been displayed a predetermined number of times by switching operations between the tabs in the setting menu, selecting help information relating to setting items corresponding to the one or more specific tabs.

* * * * *